US011584023B2

(12) United States Patent
Bolton et al.

(10) Patent No.: US 11,584,023 B2
(45) Date of Patent: Feb. 21, 2023

(54) SEPARABLE ROBOTIC INTERFACE

(71) Applicants: William George Bolton, Longmont, CO (US); Jonathan Andrew Goff, Lafayette, CO (US)

(72) Inventors: William George Bolton, Longmont, CO (US); Jonathan Andrew Goff, Lafayette, CO (US)

( * ) Notice: Subject to any disclaimer, the term of this patent is extended or adjusted under 35 U.S.C. 154(b) by 854 days.

(21) Appl. No.: 16/547,248

(22) Filed: Aug. 21, 2019

(65) Prior Publication Data
US 2020/0061848 A1 Feb. 27, 2020

Related U.S. Application Data

(60) Provisional application No. 62/720,285, filed on Aug. 21, 2018.

(51) Int. Cl.
*B25J 15/04* (2006.01)
*B23Q 3/155* (2006.01)
*B25J 19/00* (2006.01)
*B25J 15/00* (2006.01)
*B25J 18/00* (2006.01)
*B25J 9/00* (2006.01)

(52) U.S. Cl.
CPC ........ *B25J 15/0408* (2013.01); *B23Q 3/1554* (2013.01); *B25J 9/0009* (2013.01); *B25J 15/0019* (2013.01); *B25J 15/0416* (2013.01); *B25J 18/00* (2013.01); *B25J 19/0016* (2013.01); *B25J 19/0041* (2013.01); *B23Q 2003/155404* (2016.11); *F16C 2322/59* (2013.01)

(58) Field of Classification Search
CPC ....... B25J 15/04; B25J 15/0416; B23Q 3/155; B23Q 3/1554
See application file for complete search history.

(56) References Cited

U.S. PATENT DOCUMENTS

| | | | | |
|---|---|---|---|---|
| 3,822,951 A | * | 7/1974 | Bornzin | F16D 3/387 403/322.2 |
| 4,259,876 A | | 4/1981 | Belyanin et al. | |
| 4,395,006 A | | 7/1983 | Taylor | |
| 4,636,135 A | * | 1/1987 | Bancon | B25J 15/0491 483/901 |
| 4,676,142 A | * | 6/1987 | McCormick | B25J 15/04 279/4.06 |

(Continued)

*Primary Examiner* — William C Joyce
(74) *Attorney, Agent, or Firm* — Thomas J. Lavan

(57) ABSTRACT

A separable robotic interface includes a carrier portion, configured to attach to a free end of a robotic arm, and a probe portion, configured to be attached to a toolhead. The carrier portion includes a spring-loaded plug, coaxial with and arranged to slide lengthwise within the carrier portion, one or more ball bearings, arranged within holes of the carrier portion, and an axial lock feature. The probe portion may include a probe, which includes one or more recesses on lateral exterior surfaces of the probe and configured to receive ball bearings in order to axially lock the carrier portion to the probe portion in response to the probe portion inserted a predetermined distance into the carrier portion and the axial lock feature is activated. The probe portion is further configured to radially align with the carrier portion in response to an alignment feature engages the carrier portion.

10 Claims, 15 Drawing Sheets

Fixture Interface to the Separable Robotic Interface

(56) References Cited

U.S. PATENT DOCUMENTS

| | | | | |
|---|---|---|---|---|
| 4,708,548 | A | * | 11/1987 | Taylor .................. B23B 31/1071 279/81 |
| 5,145,130 | A | | 9/1992 | Purves |
| 5,390,571 | A | * | 2/1995 | Fox, III ............... B25B 23/0035 81/177.85 |
| 5,509,707 | A | | 4/1996 | Schauer |
| 6,003,414 | A | * | 12/1999 | Hsieh .................. B25B 23/0014 81/177.85 |
| 7,479,198 | B2 | | 1/2009 | Guffrey et al. |
| 7,551,419 | B2 | | 6/2009 | Pelrine et al. |
| 7,773,363 | B2 | | 8/2010 | Pelrine et al. |
| 8,601,667 | B2 | * | 12/2013 | Norton ................ B23B 31/1071 279/81 |
| 10,166,685 | B2 | * | 1/2019 | Haruna .................... B25J 18/04 |
| 2003/0229420 | A1 | | 12/2003 | Buckingham et al. |
| 2006/0237126 | A1 | | 10/2006 | Guffrey et al. |
| 2007/0063375 | A1 | | 3/2007 | Tuma |
| 2008/0169003 | A1 | | 7/2008 | Curtis |
| 2008/0237400 | A1 | | 10/2008 | Gryniewski et al. |
| 2009/0322041 | A1 | * | 12/2009 | Norton ...................... B25J 15/04 29/428 |
| 2016/0059424 | A1 | * | 3/2016 | Zachary ............... B25J 15/0416 483/1 |

\* cited by examiner

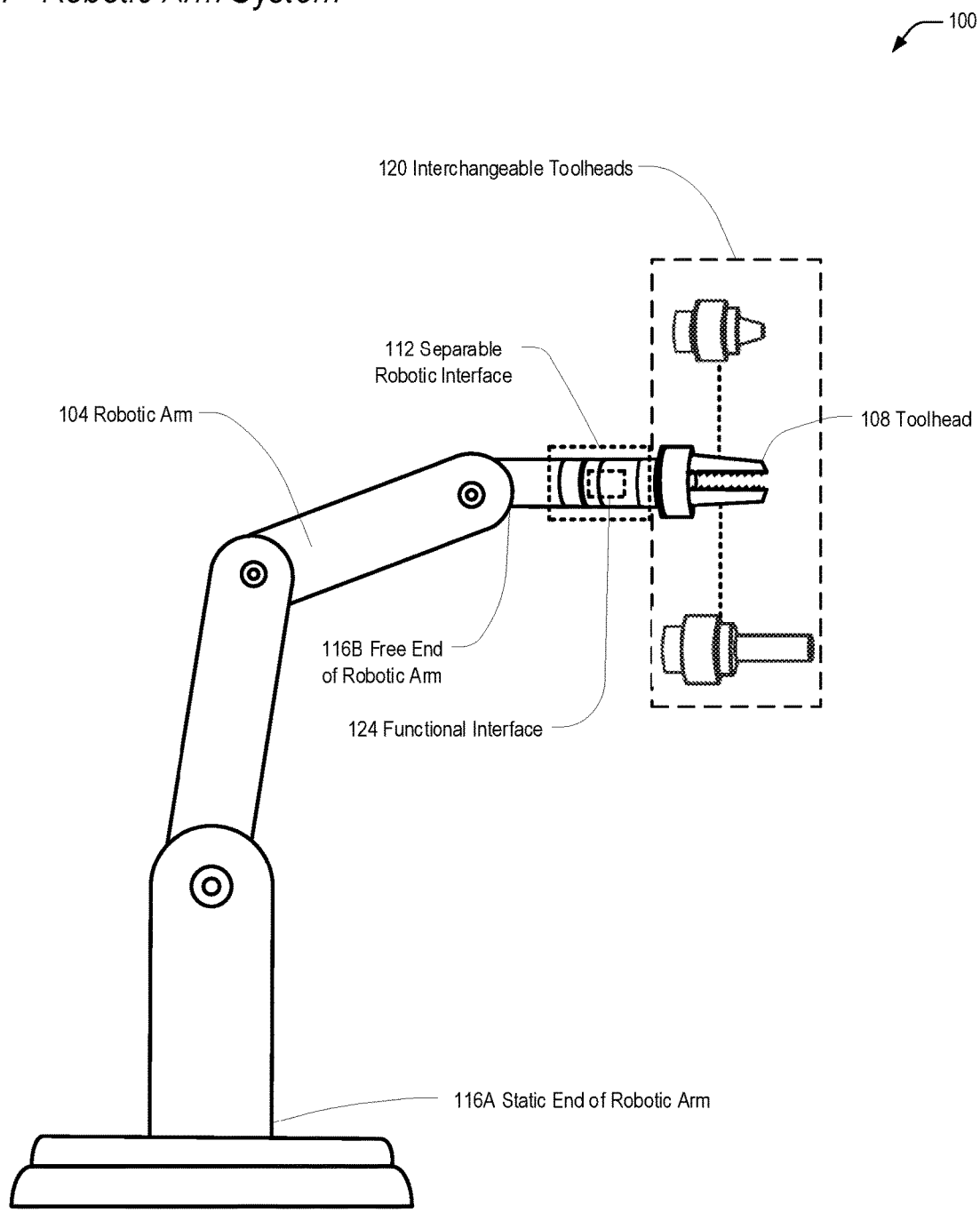
Fig. 1 Robotic Arm System

Fig. 2 Separable Robotic Interface
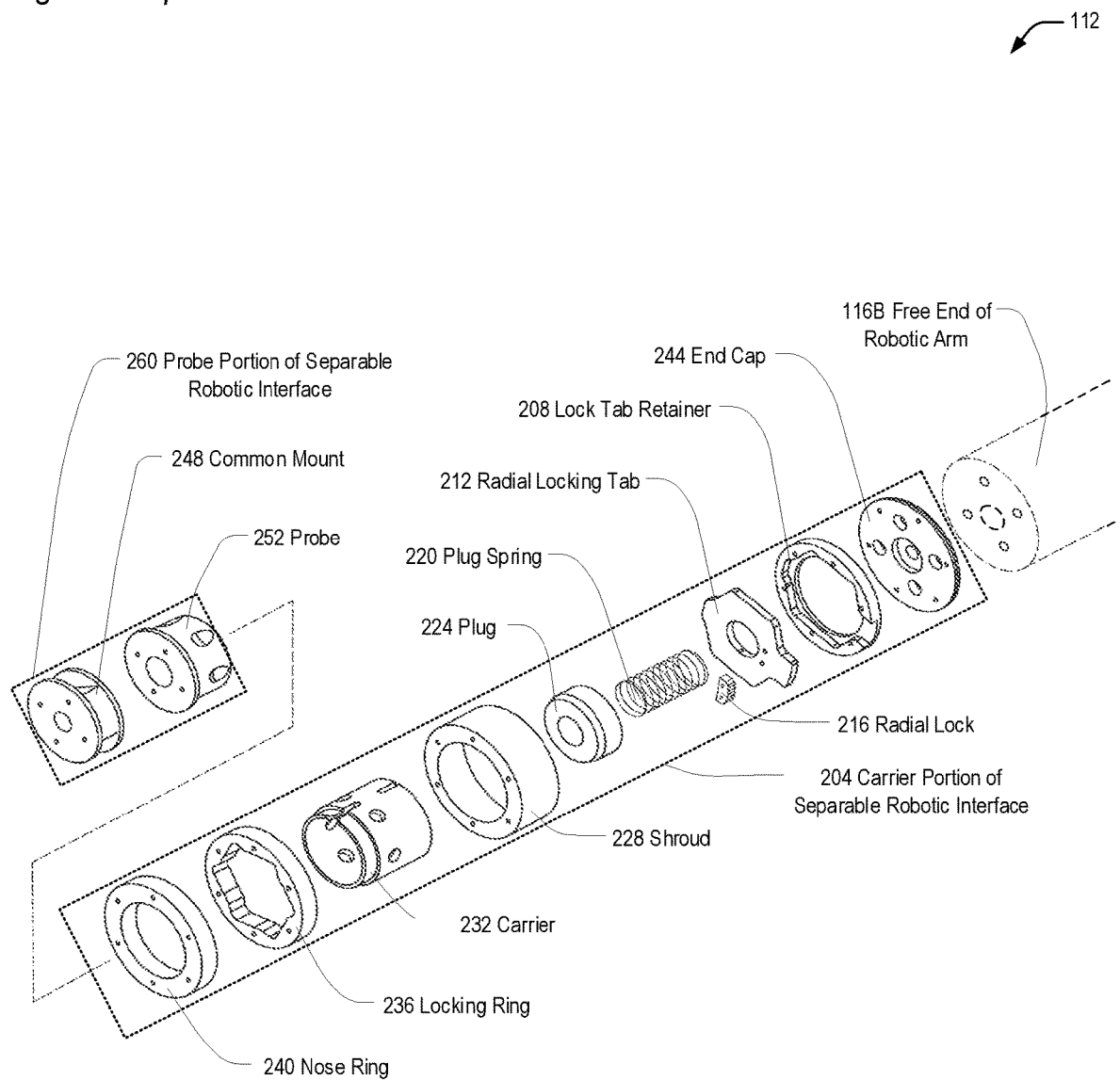

Fig. 3  Carrier Portion Interface to Robotic Arm
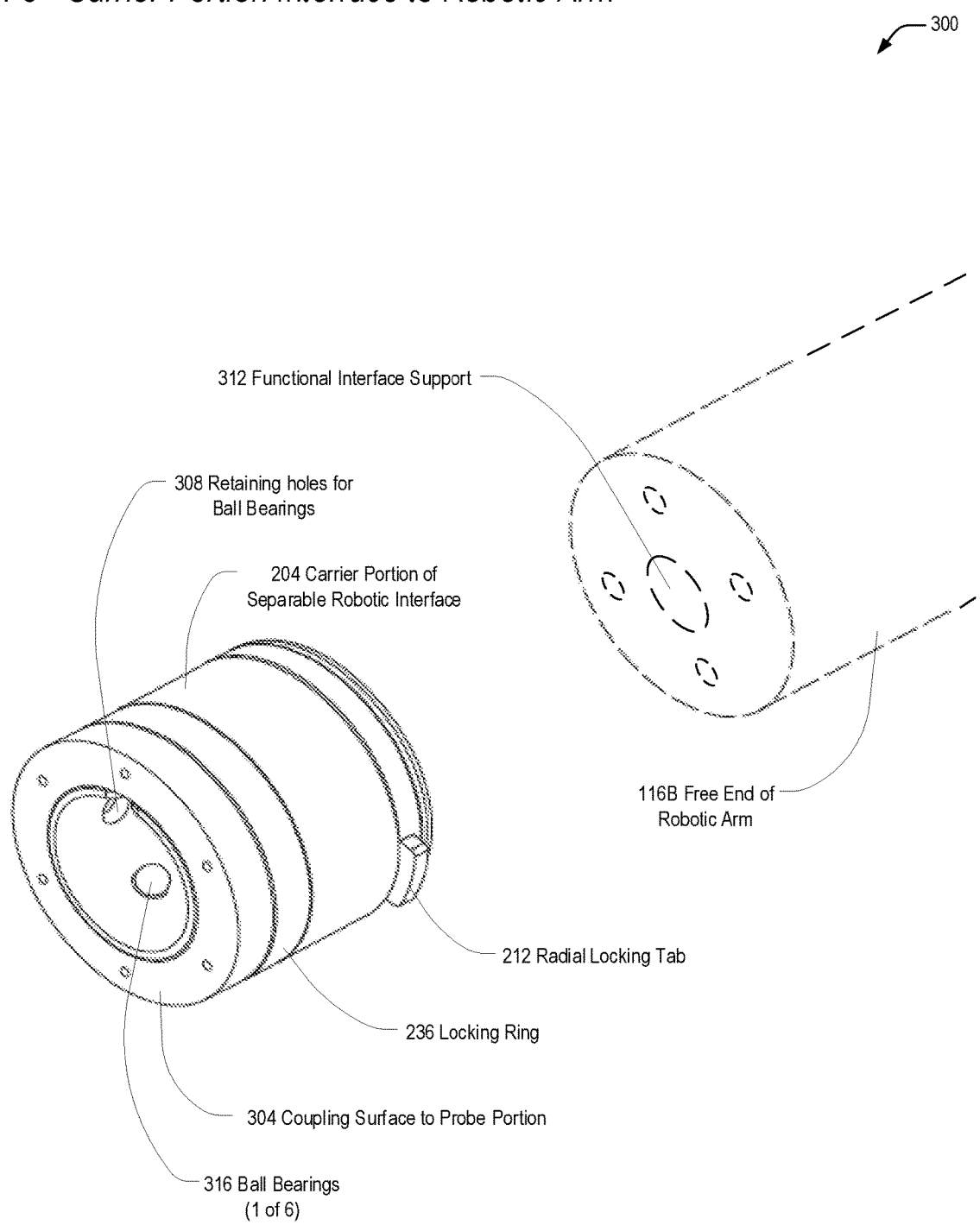

Fig. 4 Ball Bearing Fit and Position to Probe
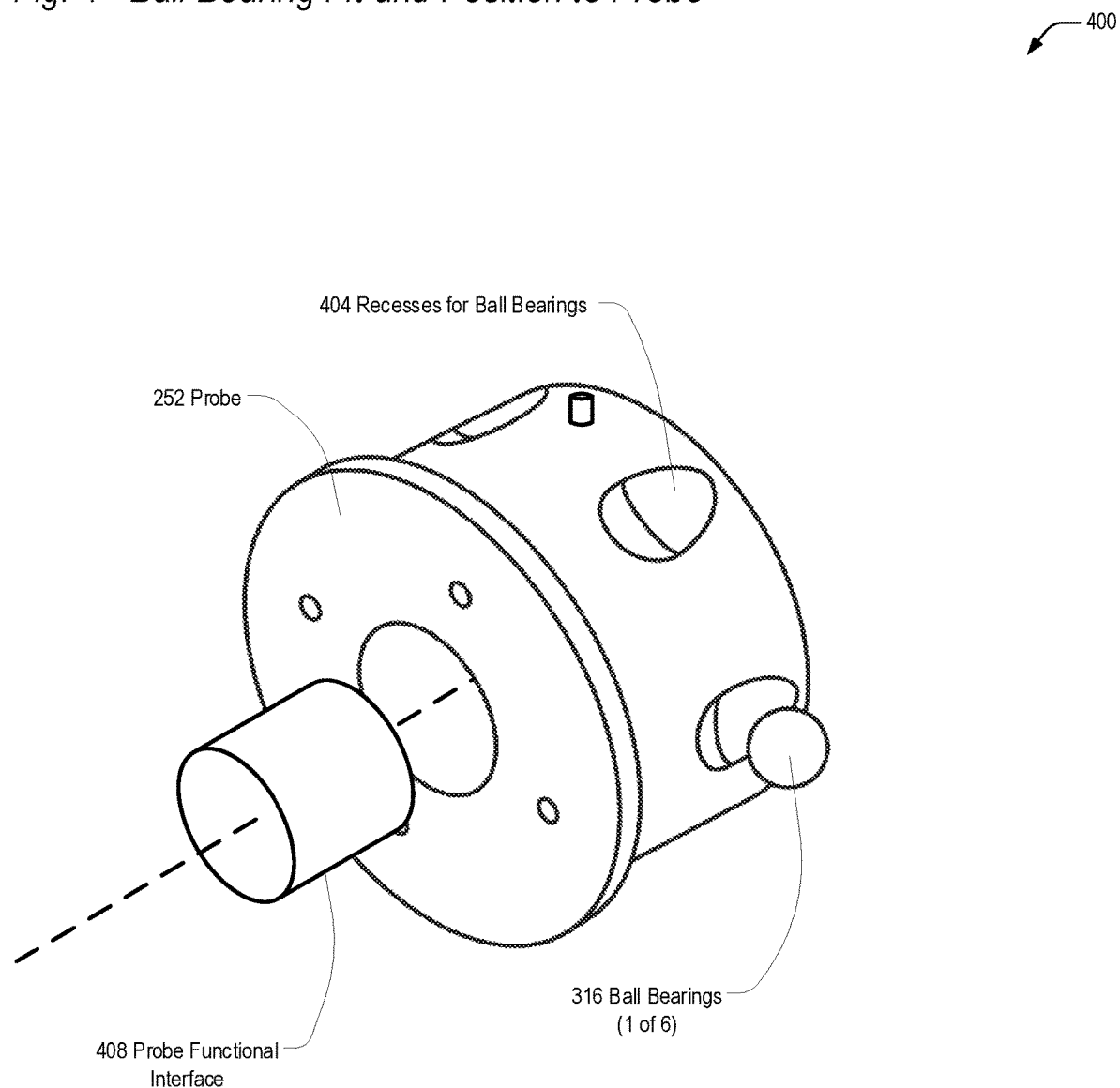

Fig. 5  Probe and Plug Fit to Carrier
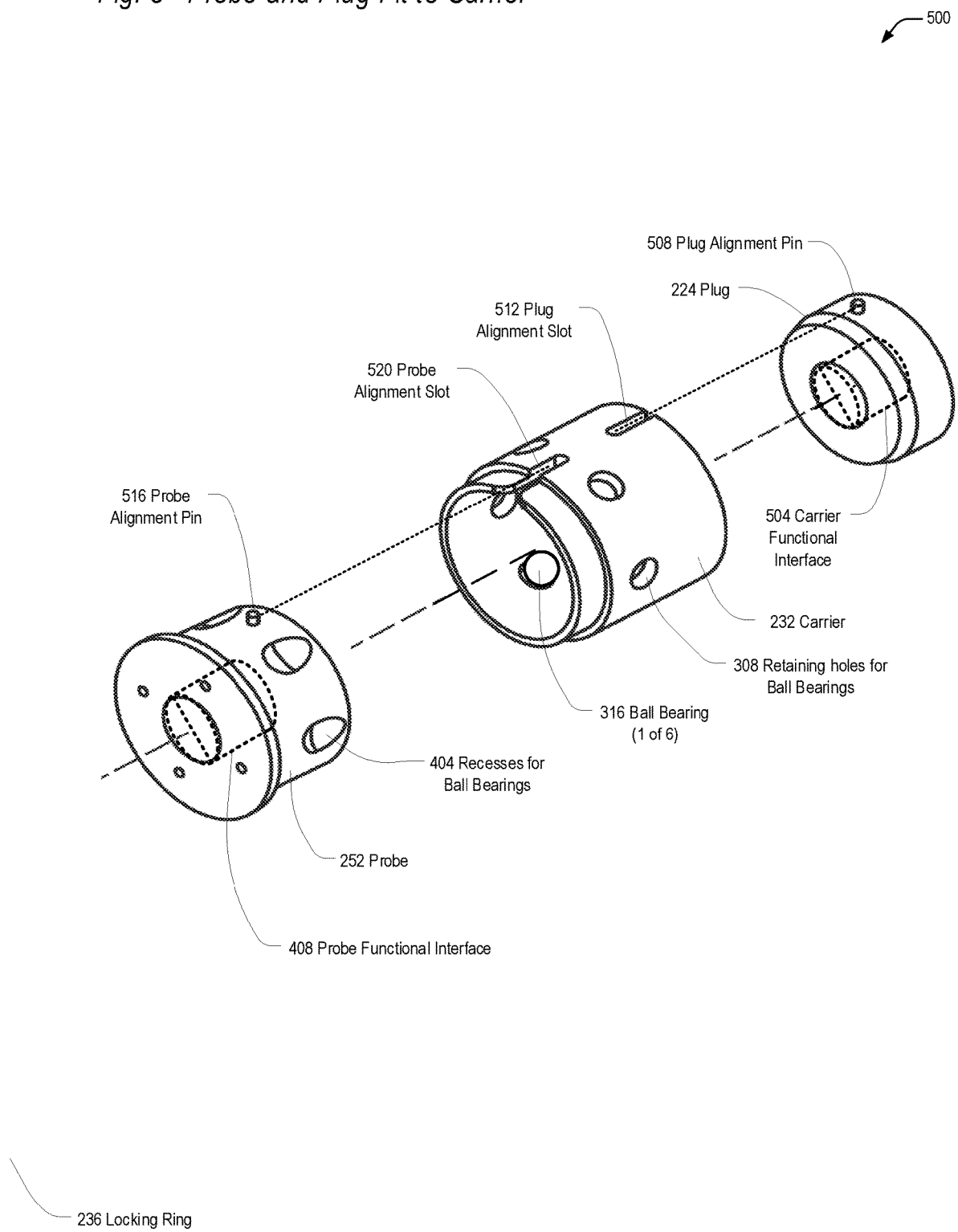

Fig. 6A  Locking Ring in Locked Disposition
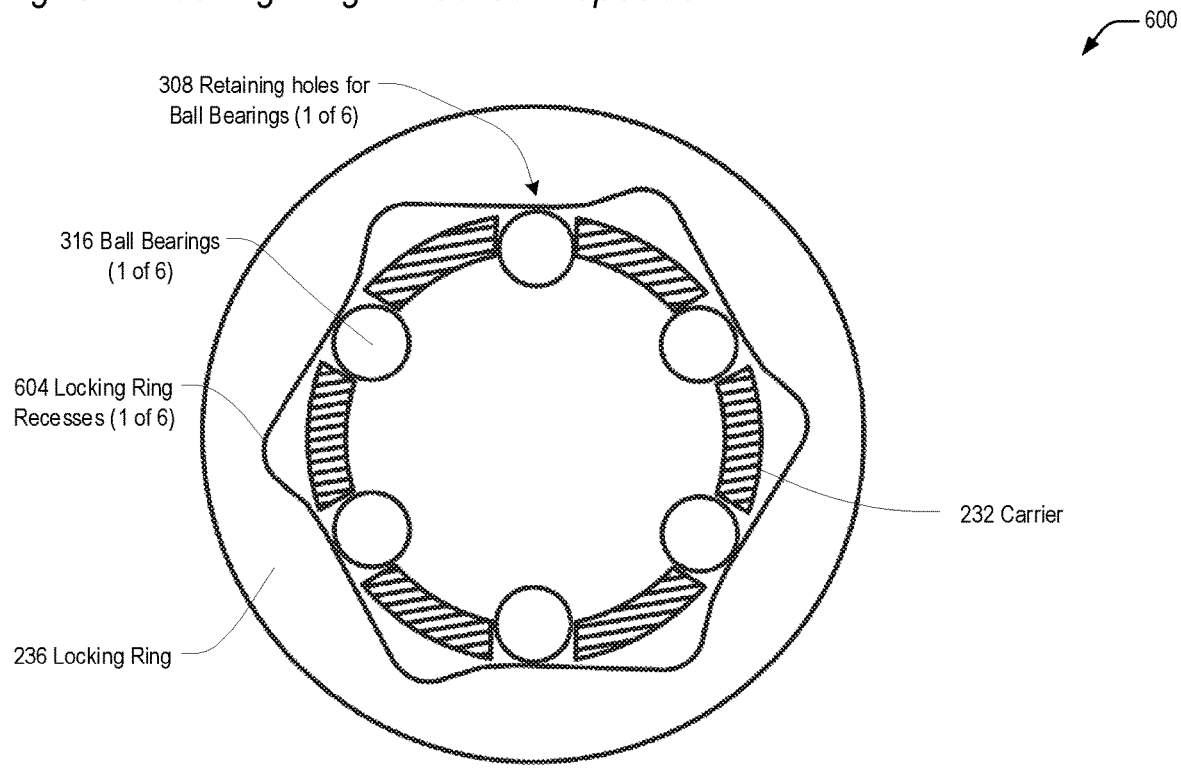
Fig. 6B  Locking Ring in Unlocked Disposition
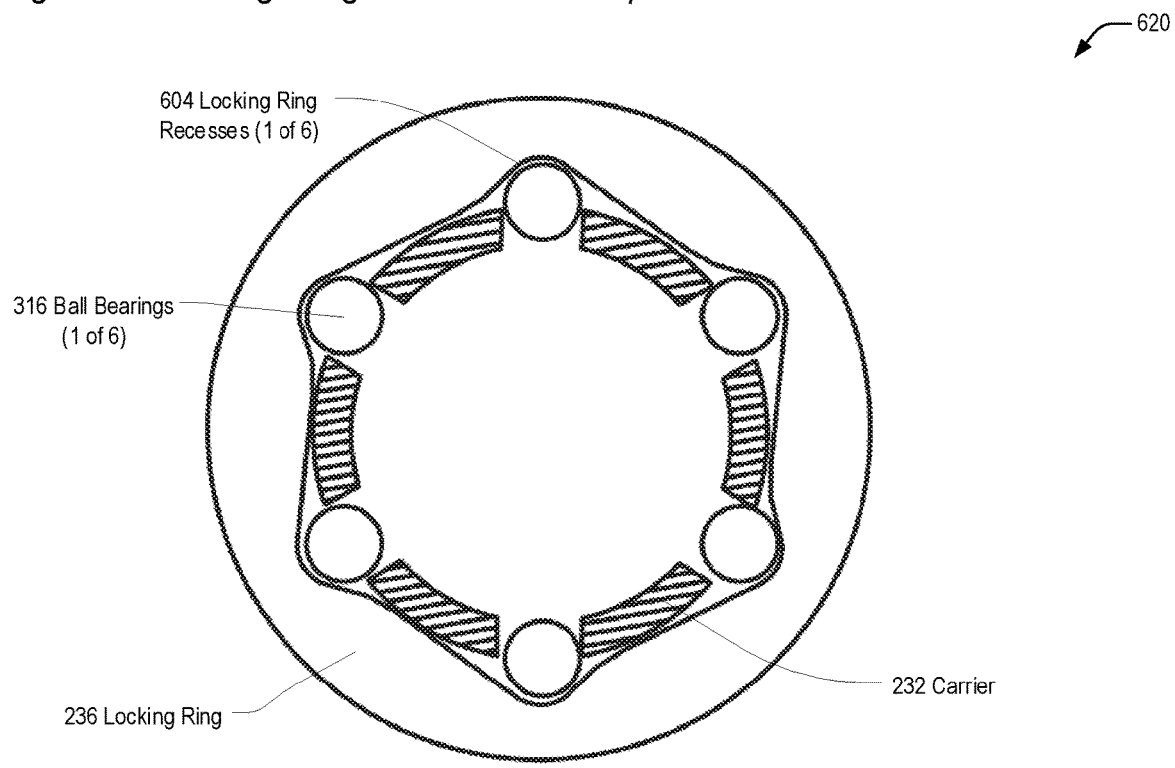

Fig. 7 Radial Locking System
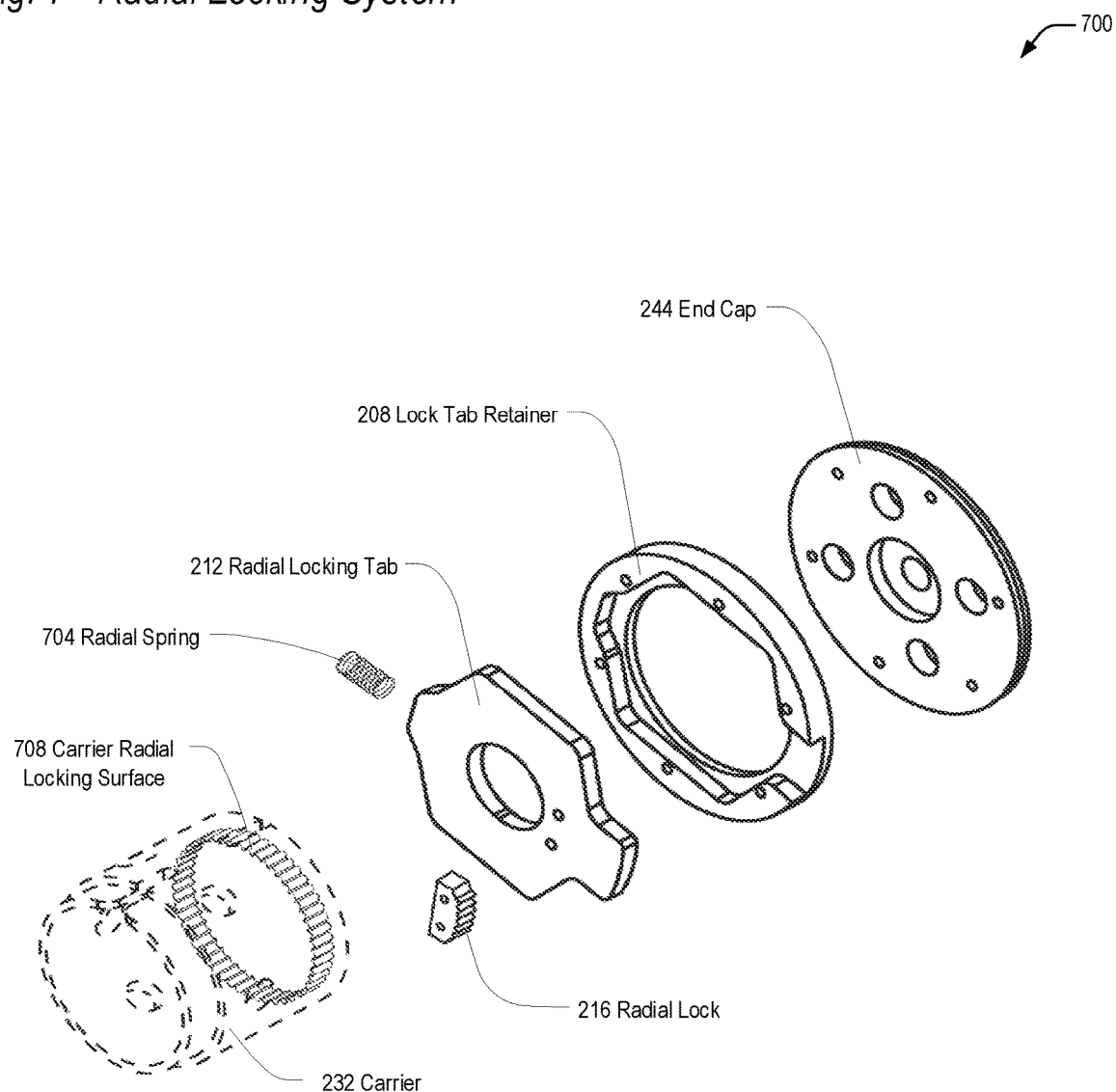

Fig. 8  Fixture Interface to the Separable Robotic Interface
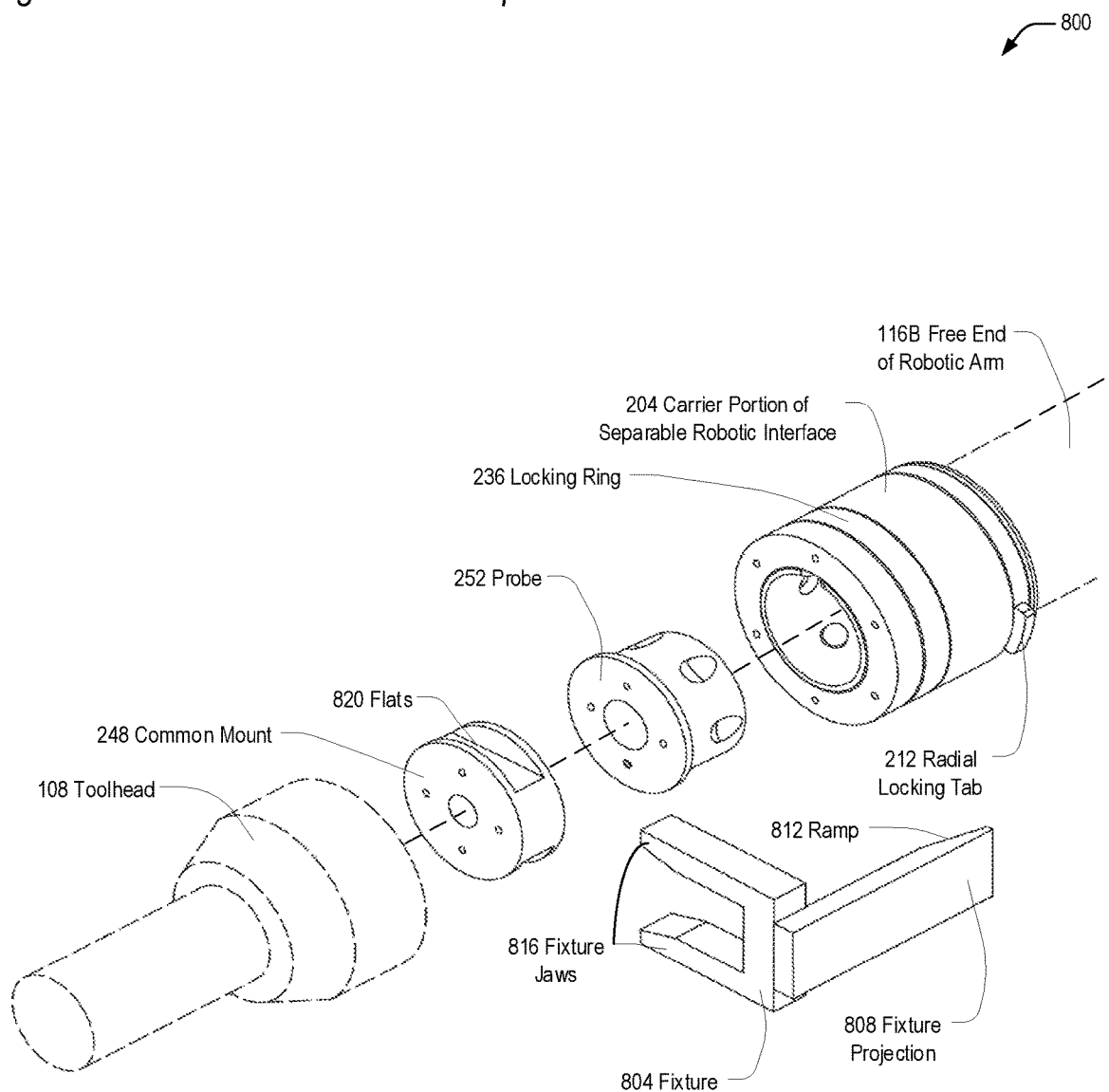

Fig. 9 Toolhead Assembly Interface to Fixture
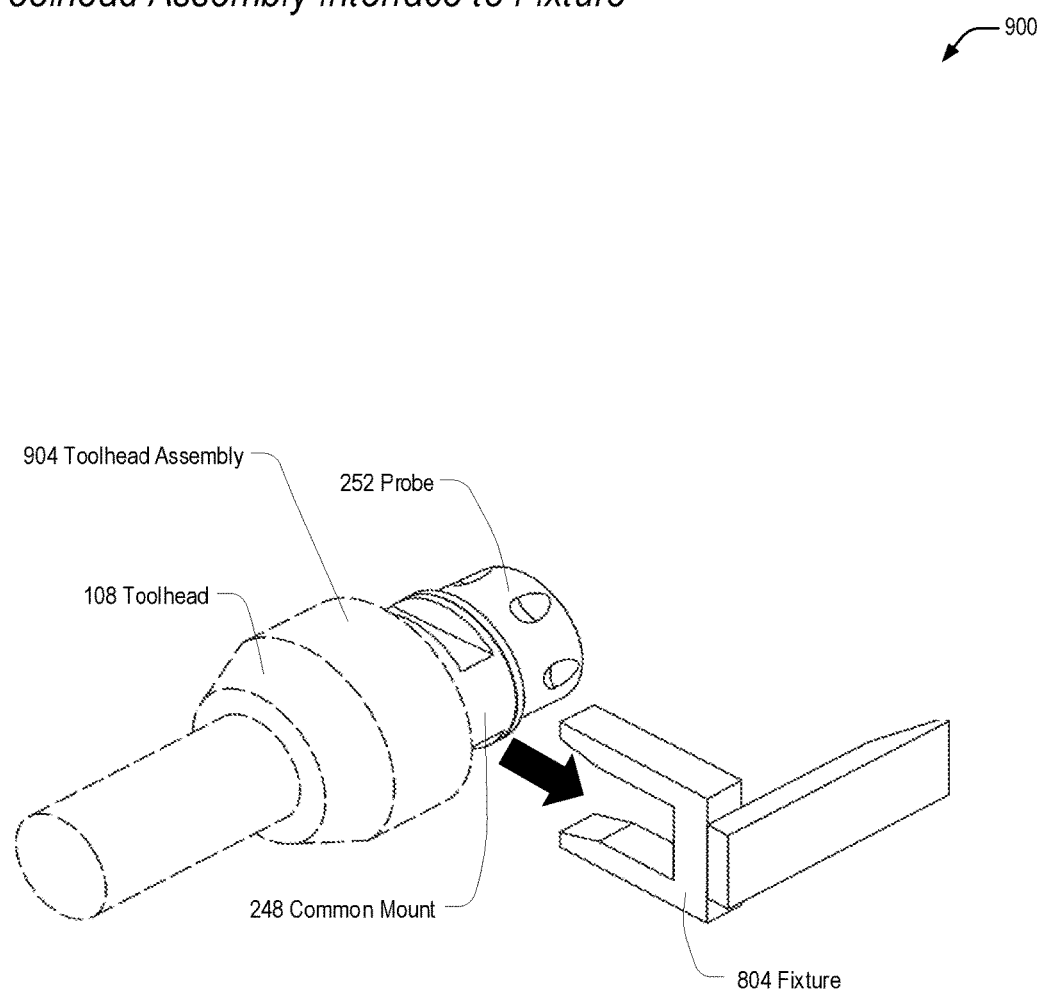

Fig. 10 Axially Align Carrier Portion with Probe Portion
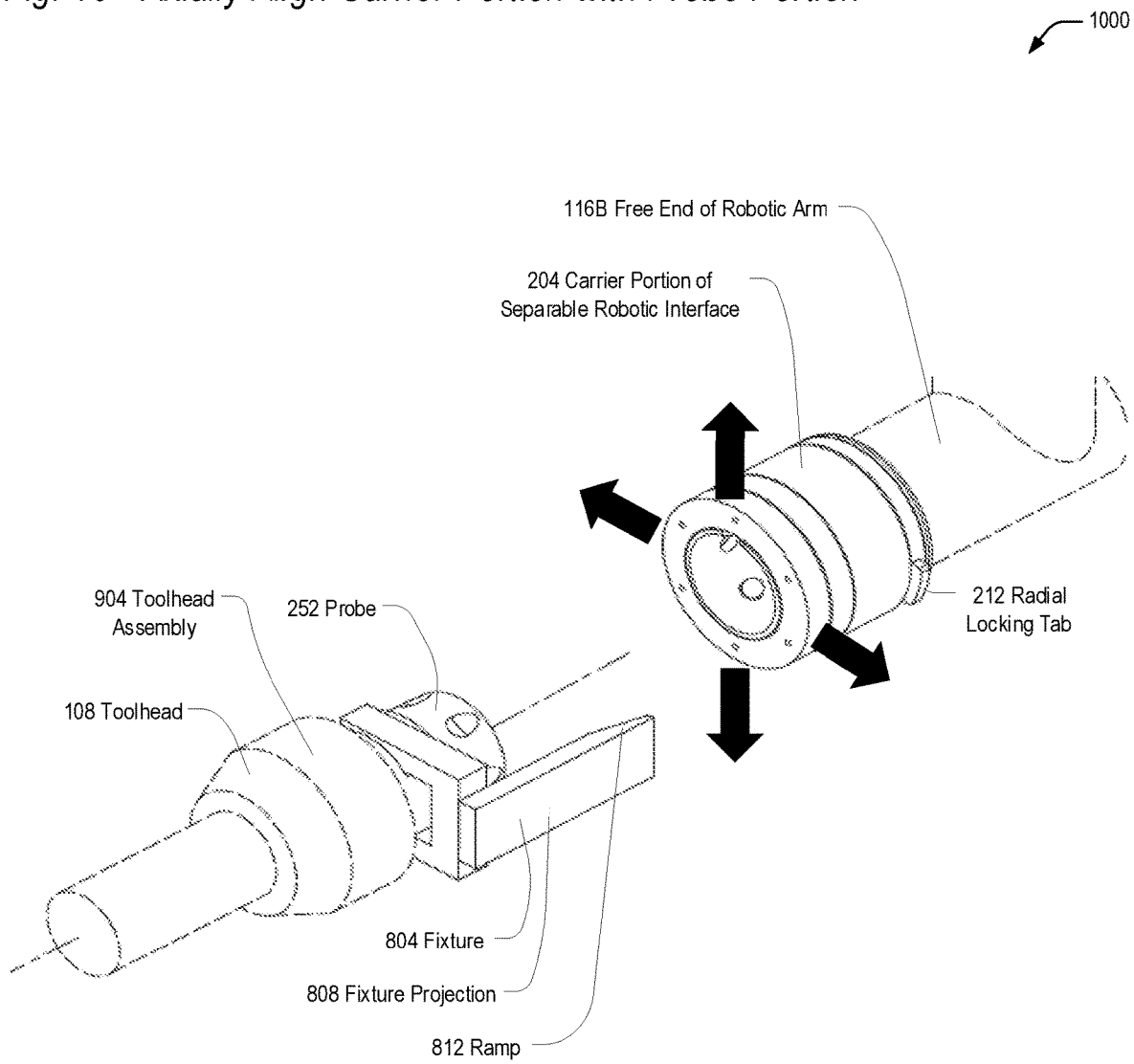

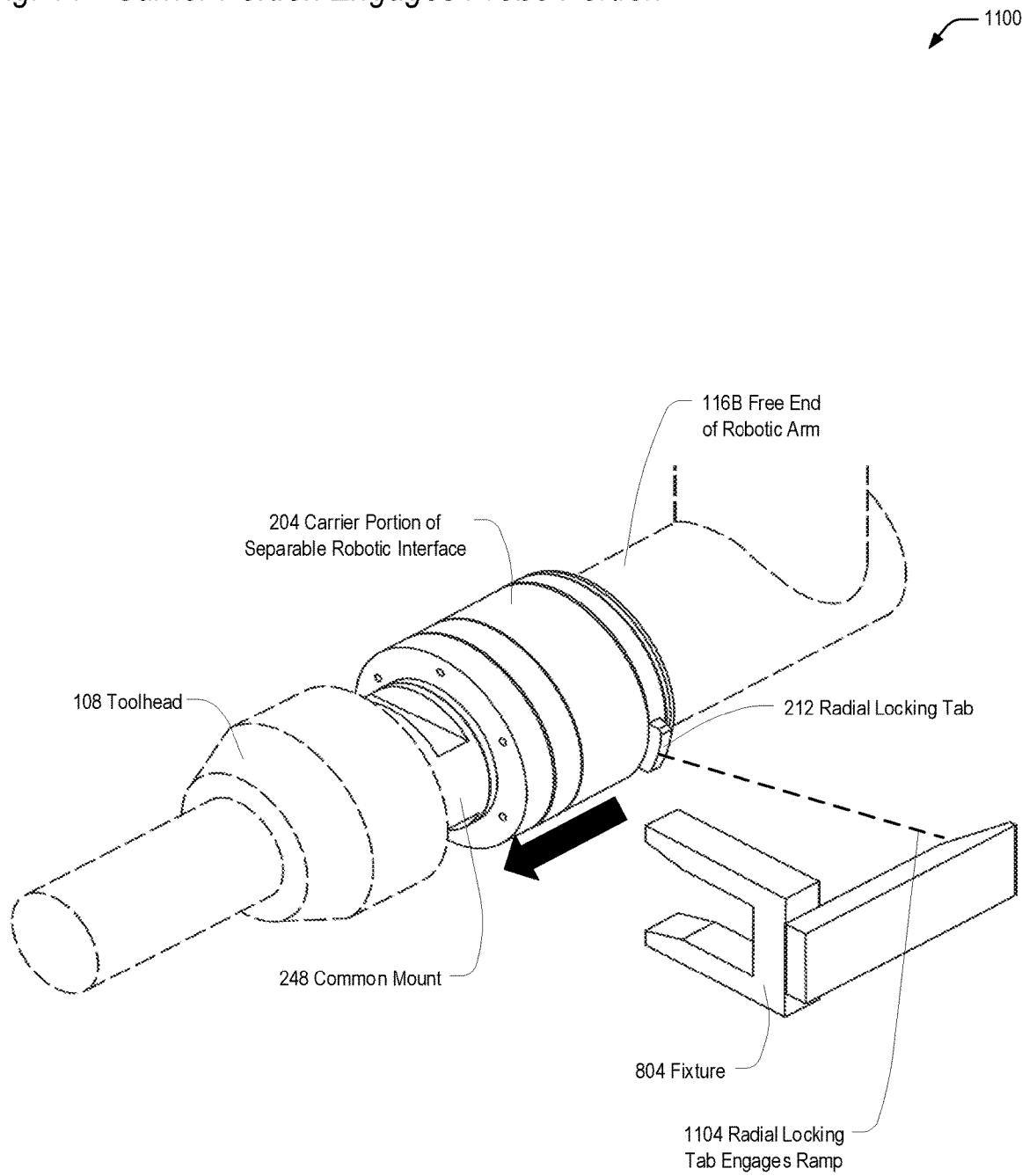
Fig. 11 Carrier Portion Engages Probe Portion

Fig. 12 Axial and Radial Locking
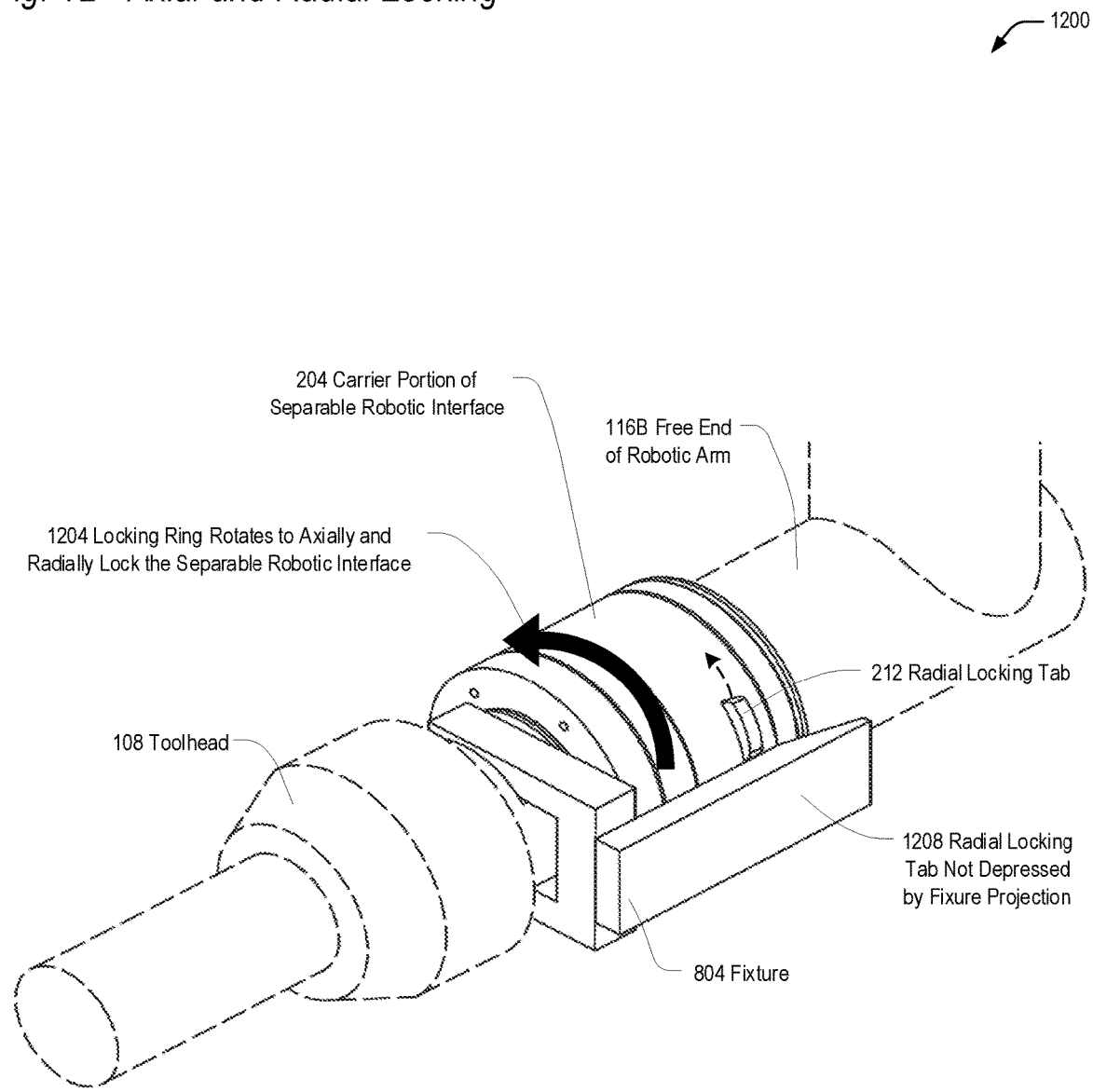

Fig. 13 Remove Toolhead and Separable Interface from Fixture
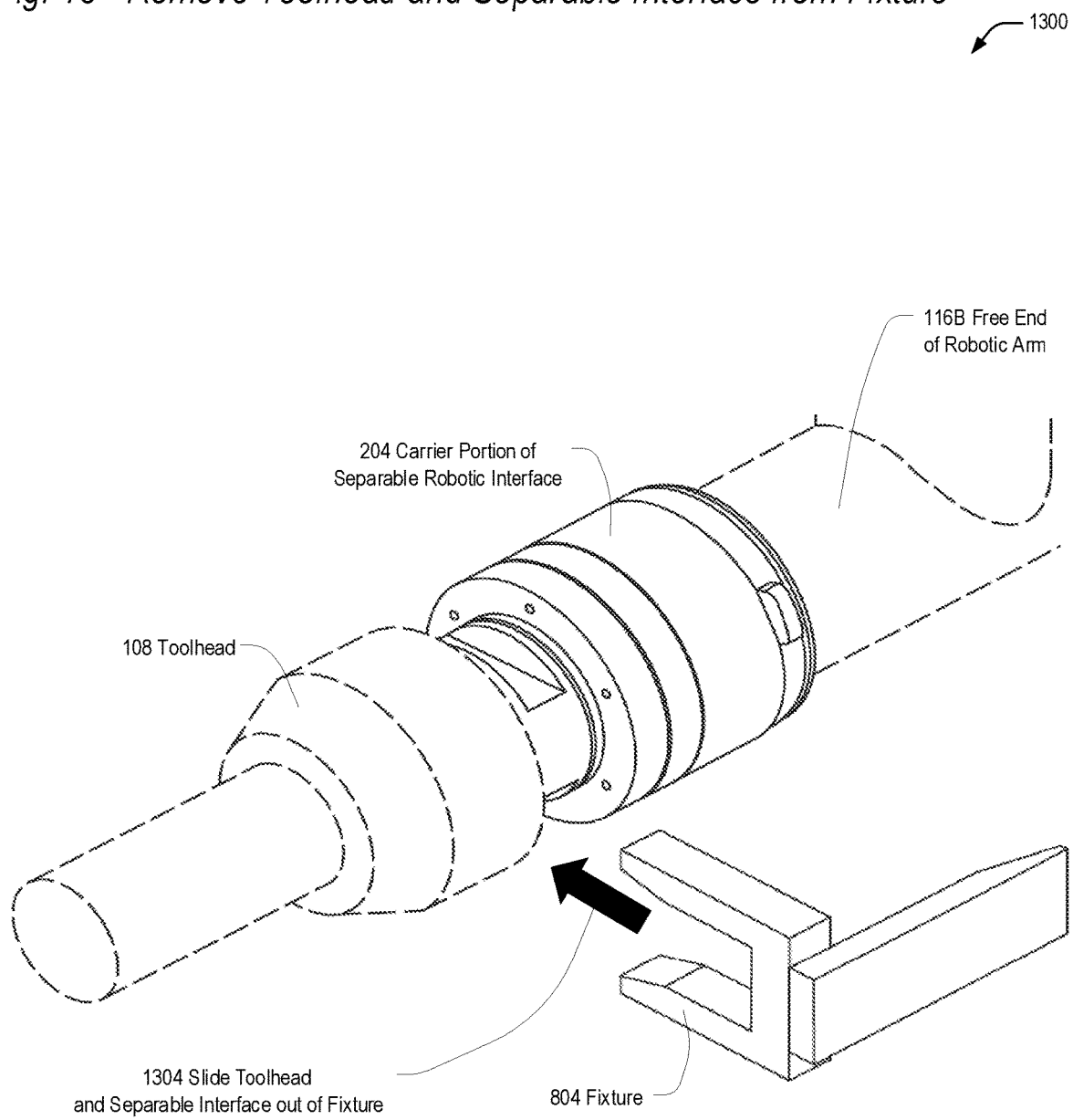

*Fig. 14  Separable Interface Mating Process*
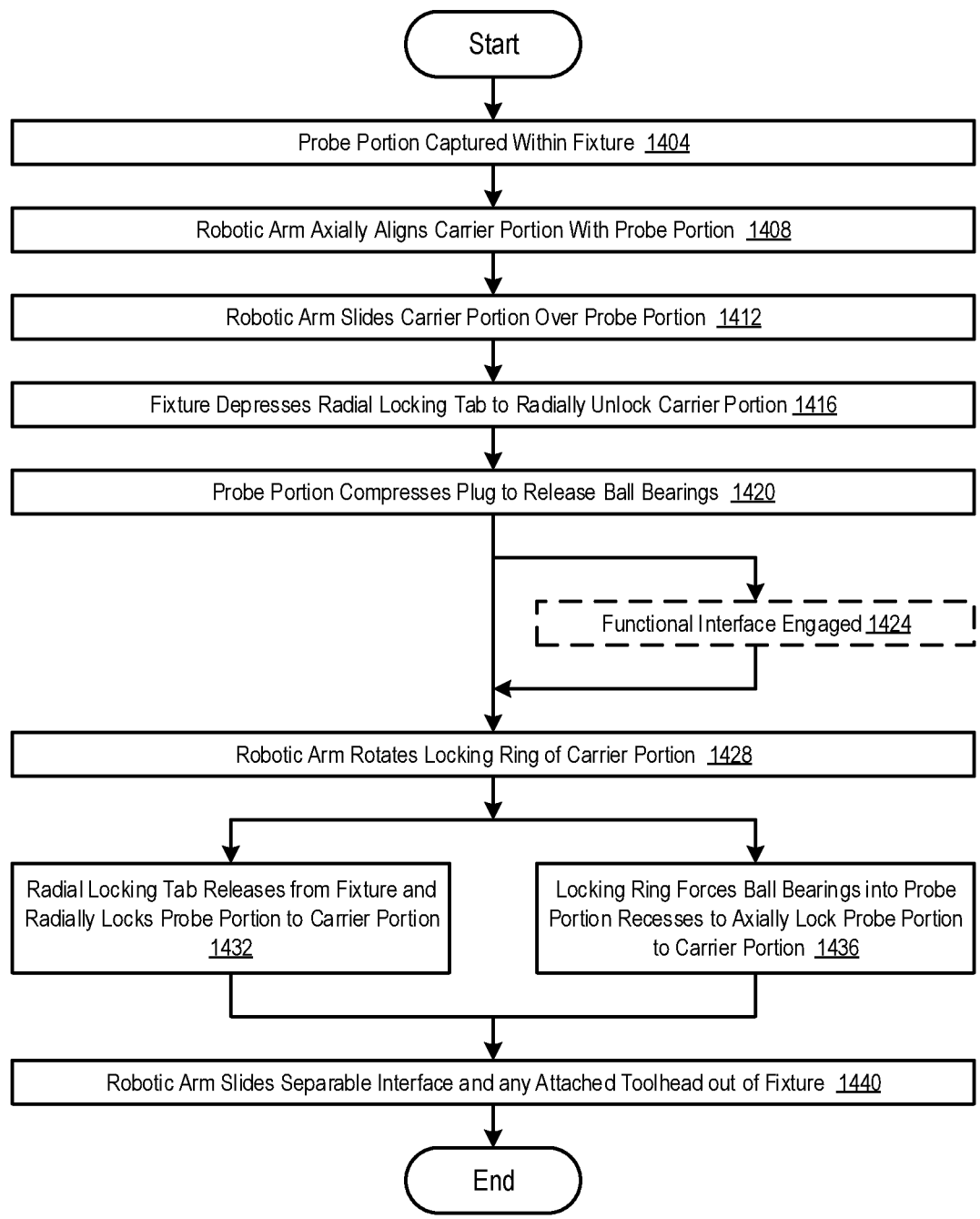

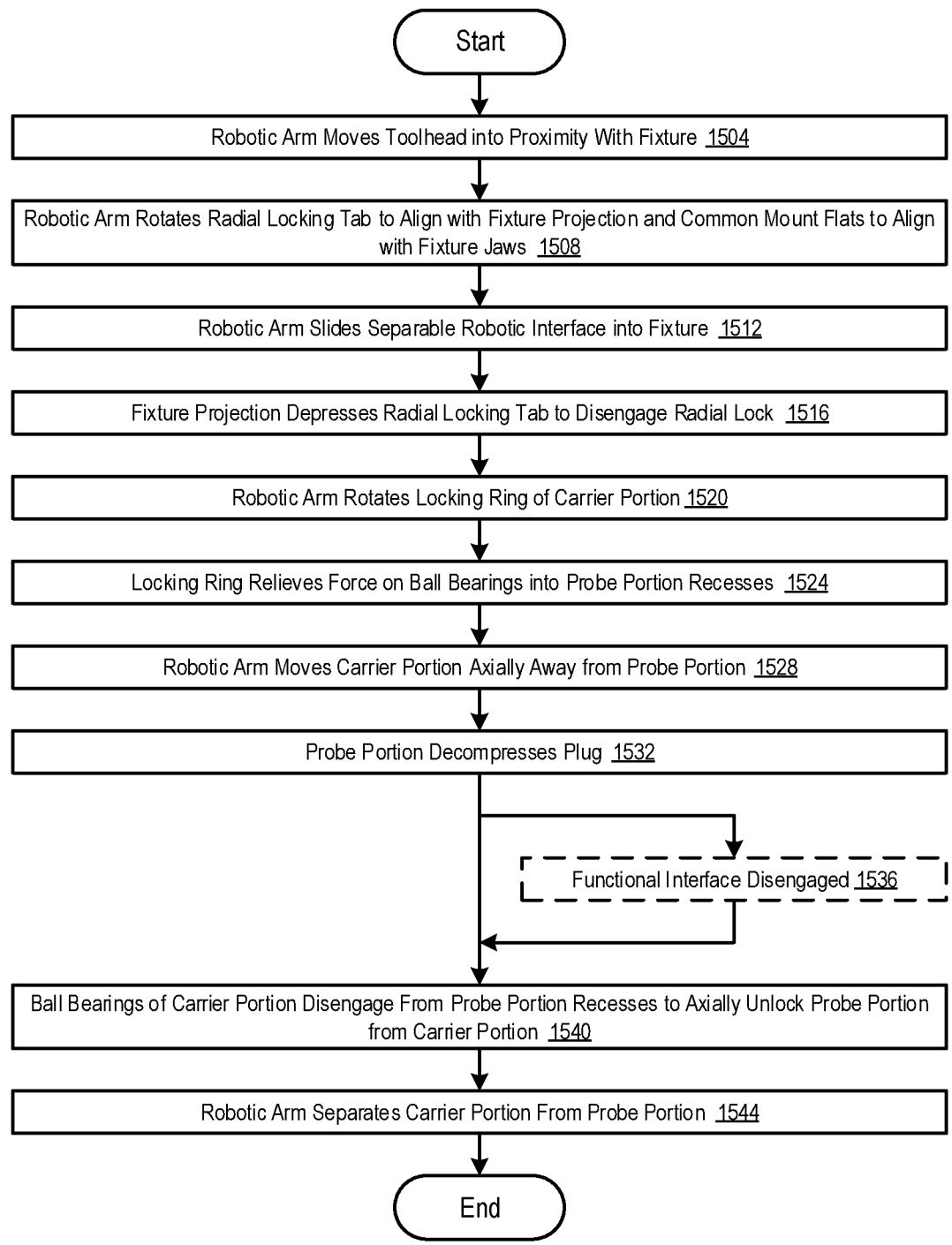

SEPARABLE ROBOTIC INTERFACE

CROSS REFERENCE TO RELATED APPLICATIONS

This application claims priority from Provisional U.S. application 62/720,285, filed Aug. 21, 2018, entitled SEPARABLE SPACECRAFT INTERFACE, which is hereby incorporated by reference for all purposes.

FIELD

The present invention is directed to separable robotic interfaces. In particular, the present invention is directed to methods and apparatuses for providing separable robotic toolheads for securing tools, components, or materials to robotic manipulators.

BACKGROUND

Robotic arms have been in existence for several decades. Many industries utilize robotic arms to speed production, improve product assembly quality, and manipulate hazardous objects and materials. Most robotic arms in the world are designed for heavy or repetitive manufacturing work, and handle tasks that are difficult, dangerous, or boring to human beings. A typical robotic arm is controlled by a computer by activating individual stepper motors or actuators connected at each joint. At a minimum, a robotic arm has a single segment and a joint at each end. Robotic arms often use motion sensors to regulate movement in precise increments.

Current technology robotic arms utilize capture heads incorporating mechanical grippers, where mechanical force between two or more surfaces are used to positively capture and move objects. Mechanical grippers are suitable to capture known objects of predictable size, shape, and orientation, and having robust attachment surfaces.

SUMMARY

The present invention is directed to solving disadvantages of the prior art. In accordance with embodiments of the present invention, a separable robotic interface is provided. The separable robotic interface includes a carrier portion, configured to attach to a free end of a robotic arm, and a probe portion, configured to be attached to a toolhead. The carrier portion includes a spring-loaded plug, coaxial with and arranged to slide lengthwise within the carrier portion, one or more ball bearings, arranged within holes of the carrier portion, and an axial lock feature. The probe portion may include a probe, which includes one or more recesses on lateral exterior surfaces of the probe and configured to receive the ball bearings in order to axially lock the carrier portion to the probe portion in response to the probe portion inserted a predetermined distance into the carrier portion and the axial lock feature is activated. The probe portion is further configured to radially align with the carrier portion in response to an alignment feature engages the carrier portion.

In accordance with another embodiment of the present invention, a method is provided. The method includes one or more of axially aligning a carrier portion of a separable robotic interface with a probe portion, sliding the carrier portion over the probe portion in response to radially orienting a first alignment feature between the probe portion and the carrier portion, seating the one or more ball bearings into matching recesses in an outer surface of the probe portion in response to sliding the carrier portion over the probe portion a predetermined distance, and rotating a locking ring of the carrier portion to axially lock the carrier portion to the probe portion. In response to sliding the carrier portion over the probe portion, the method further includes compressing, by the probe portion, a spring-loaded plug in the carrier portion to release the one or more ball bearings to make contact with the outer surface of the probe portion. The plug is radially coupled to the carrier portion through a second alignment feature, and the carrier portion is coupled to a free end of a robotic arm.

In accordance with yet another embodiment of the present invention, a method is provided. The method includes one or more of moving, by a robotic arm, a separable robotic interface controlled by the robotic arm into proximity with a fixture. The separable robotic interface includes a carrier portion axially and radially locked to a probe portion. The method also includes rotating a radial locking tab of the carrier portion to align with a projection of the fixture, sliding the probe portion into the fixture, and in response depressing the radial locking tab by the projection to radially unlock the carrier portion. The method further includes rotating a locking ring of the carrier portion, and in response relieving pressure on one or more ball bearings in matching recesses of an outer surface of the probe portion and axially unlocking the carrier portion from the probe portion. Finally, the method includes removing, by the robotic arm, the carrier portion from the probe portion. The fixture axially captures the probe portion.

An advantage of the present invention is that it provides a standard interface for various types of robotic end effectors. A standard interface makes it easier for competing hardware developers to create families of robotic end effectors that may utilize the same interface. Thus, a large selection of robotic tools may be available for each such socket.

Another advantage of the present invention is it provides a common mount providing both a secure interface for tool mounting while allowing tool changing or replacement without requiring human servicing or intervention.

Another advantage of the present invention is it provides a locking mechanism that provides for secure locking of the two portions of the separable robotic interface without requiring human servicing or intervention.

Another advantage of the present invention is that in some embodiments it provides for power and/or data connections through the separable robotic interface. No electrical connections are made until a probe component is seated within a capture assembly. Power and data connections allow use of robotic end effectors that may include various forms of cameras, active or passive sensors, or actuated (i.e. power) tools.

Another advantage of the present invention is when mounted with a tool/probe, the separable robotic interface has a radial locking mechanism that resists rotational forces transmitted back through a toolhead towards the robotic arm. Without the rotational lock, the tool/probe may become dislodged during normal use.

Additional features and advantages of embodiments of the present invention will become more readily apparent from the following description, particularly when taken together with the accompanying drawings.

BRIEF DESCRIPTION OF THE DRAWINGS

FIG. 1 is a diagram illustrating a robotic arm system in accordance with embodiments of the present invention.

FIG. 2 is a diagram illustrating an exploded view of a separable robotic interface in accordance with embodiments of the present invention.

FIG. 3 is a diagram illustrating a carrier portion of an interface to a robotic arm in accordance with embodiments of the present invention.

FIG. 4 is a diagram illustrating ball bearing fit and position to the probe in accordance with embodiments of the present invention.

FIG. 5 is a diagram illustrating a probe and plug fit to a carrier in accordance with embodiments of the present invention.

FIG. 6A is a diagram illustrating a locking ring in a locked disposition in accordance with embodiments of the present invention.

FIG. 6B is a diagram illustrating a locking ring in an unlocked disposition in accordance with embodiments of the present invention.

FIG. 7 is a diagram illustrating a radial locking system in accordance with embodiments of the present invention.

FIG. 8 is a diagram illustrating a fixture interface to the separable robotic interface in accordance with embodiments of the present invention.

FIG. 9 is an illustration depicting a toolhead assembly to a fixture in accordance with embodiments of the present invention.

FIG. 10 is an illustration depicting axially aligning a carrier portion with a probe portion in accordance with embodiments of the present invention.

FIG. 11 is a diagram illustrating a carrier portion engaging a probe portion
in accordance with a first embodiment of the present invention.

FIG. 12 is a diagram illustrating axial and radial locking in accordance with a second embodiment of the present invention.

FIG. 13 is a diagram illustrating removing a toolhead and separable interface from a fixture in accordance with embodiments of the present invention.

FIG. 14 is a flowchart illustrating a separable interface mating process in accordance with embodiments of the present invention.

FIG. 15 is a flowchart illustrating a separable interface unmating process in accordance with embodiments of the present invention.

DETAILED DESCRIPTION

Robotic arms may be used for manipulation of various forms, sizes, and orientations of objects of varying complexity and materials. Robotic arms may capture or act upon objects within direct visual distance of a robot operator. In some cases, a robotic arm may need to perform multiple different operations on an object—including but not limited to grasping, moving, inspection, and modifications. Each of these different operations may require a different end effector or tool, and it may be necessary to remove a current toolhead prior to installing another toolhead.

Certain environments may provide additional difficulty to changing end effectors or tools. For example, a space environment may require a human operator or maintenance personnel wearing a pressurized suit to change toolheads. Certain environments may be severely space-limited to change toolheads. Yet other environments may require high operating temperatures, high radiation levels, the presence of caustic or toxic gases or chemicals, or biologic dangers that discourages human involvement in changing toolheads.

The present application describes a separable interface for robotic toolheads. The separable robotic interface may be used to securely hold tools and/or components or materials in a robotic tool environment in order to easily and rapidly make toolhead changes without the need for human intervention. The separable interface also allows changing toolheads without requiring tools.

Referring now to FIG. 1, a diagram illustrating a robotic arm system 100 in accordance with embodiments of the present invention is shown. The robotic arm system 100 is generally characterized as a multi-segment robotic arm 104, where one end is a static end 116A fixed to a structure and the other end is a free end 116B that is able to be actuated and moved under operator or computer control. The structure supporting the static end may be a floor of a building, a wall, a ceiling, or a vehicle of some sort. In some embodiments, the vehicle may be a spacecraft, an aircraft, a ground-based vehicle, or a watercraft. In some embodiments, the static end of the robotic arm 116A may be relocated and/or repositioned for various purposes.

The free end of the robotic arm 116B is coupled to a separable robotic interface 112 that provides for tool-free replacement of any number of interchangeable toolheads 120, including a currently installed toolhead 108. Toolheads 108, 120 may include any number or type of functions, and may perform one or more of grasping, object capture, material movement, fluid or gas transfer, or any forms of sensors/sensing. In one embodiment, a toolhead may include a coupling fixture to attach to a same or different structure than the static end of the robotic arm 116A. Toolheads 108, 120 may include inert and non-actuated toolheads such as a hammer, a chisel, or a suction cup. Toolheads 108, 120 may also include actuated toolheads such as a drill, an actuated gripper, a reciprocating saw, or an independently movable sensor. Actuation may be by electrical power, hydraulic fluid, compressed gas, mechanical force transfer (e.g., torque), magnetic force, or any other means provided through a functional interface 124 as further described herein.

Referring now to FIG. 2, a diagram illustrating an exploded view of a separable robotic interface 112 in accordance with embodiments of the present invention is shown. FIG. 2 illustrates the principal components of the separable robotic interface 112, according to the preferred embodiment. The separable robotic interface 112 permits tool-free replacement of any of various toolheads 108, including toolhead 108 replacements without human intervention. The separable robotic interface 112 includes two parts: a carrier portion 204 and a probe portion 260. Preferred materials may depend on the task to be performed. In one embodiment, the carrier portion 204 and the probe portion 260 may be 3D printed plastics or metals or machined aluminum or steel. In one embodiment, most components may be machined aluminum and the carrier 232 may be machined Teflon. Selection of materials may reasonably be determined by one of ordinary skill in the art according to known mechanical, environmental, and purpose criteria.

One end of the carrier portion 204 is coupled to the free end of the robotic arm 116B. In most embodiments, the carrier portion 204 is generally semi-permanently attached to the free end of the robotic arm 116B, and conventional fasteners known in the art may be used to provide the attachment. In other embodiments, the carrier portion 204 may utilize some form of quick-attach/detach fasteners to allow for rapid carrier coupling/uncoupling. Such a quick attach/detach mechanism may incorporate a twist-lock or similar type of feature. The opposite end of the carrier portion 204 is configured to be coupled to the probe portion 260, as described herein.

One end of the probe portion 260 in most embodiments is coupled to a toolhead 108. Each probe portion 260 provides a standardized interface to interchangeable toolheads 120. The present application is able to use many different toolheads 108, 120 with the same carrier portion 204 and robotic arm 104. Thus, a given robotic arm 104/carrier portion 204 may select one toolhead 108 from many interchangeable toolheads 120, depending on the task and toolhead 108, 120 availability. One may imagine a "tool crib" in proximity to the robotic arm 104, where toolheads 108 may be selected based on task and an order of need. In the preferred embodiment, each toolhead 108, 120 may be semi-permanently attached to its own probe portion 260. "Semi-permanently" because it may be necessary to separate toolheads 108, 120 from probe portions 260 in order to facilitate upgrade or maintenance to either toolheads 108, 120 or a probe portion 260.

Each carrier portion 204 may include an end cap 244, a lock tab retainer 208, a radial locking tab 212, a radial lock 216, a plug spring 220, a plug 224, a shroud 228, a carrier 232, a locking ring 236, and a nose ring 240. The carrier portion 204 may also include one or more ball bearings 408 as described herein, plus other springs and fasteners not described in detail.

The end cap 244 provides a bearing surface to mate with the free end of the robotic arm 116B, and to support the lock tab retainer 208 and the plug spring 220. In most embodiments, conventional fasteners directly attach the end cap 244 to the free end of the robotic arm 116B. For separable robotic interfaces 112 that support an optional functional interface 124, the end cap 244 must also support whatever cables, pipes, circuit boards, or other types of connections required by interchangeable toolheads 120. For example, a functional interface 124 supporting a powered optical sensor toolhead 108 may require one or more power and data connections, where the data connections may include an optical cable. The functional interface 124 may be optional, and is not shown in FIG. 2 for mechanical clarity.

The lock tab retainer 208 is rigidly attached to the end cap 244, and rotates with the end cap 244 when the free end of the robotic arm 116B rotates. The lock tab retainer 208 receives the radial locking tab 212, but allows the radial locking tab 212 to move a limited amount laterally under spring pressure (not shown). This operation is described in more detail with respect to FIG. 7. The radial lock 216 is rigidly coupled to the radial locking tab 212, and radially locks or unlocks the carrier portion 204 in response to lateral radial locking tab 212 movement.

The plug spring 220 is supported on one end by the end cap 244 and the other end by the plug 224. When the carrier portion 204 is not coupled to the probe portion 260, the plug spring 220 is mostly unloaded, and may be slightly in compression to exert a small amount of force on the plug 224 to keep the plug 224 extended toward the nose ring 240 and maintain the ball bearings 316 within the retaining holes 308. In one embodiment, the plug spring 220 exerts 2 lbs of spring force, and requires less than a pound of opposing force to compress the plug 224. The plug spring 220 passes through the lock tab retainer 208 and the radial locking tab 212.

The shroud 228 provides an outer cover to protect the carrier 232, plug 224, and plug spring 220. The shroud 228 is rigidly attached to the lock tab retainer 208 and end cap 244. The carrier 232 is disposed centrally within the shroud 228, and provides ball bearings 408 for the axial locking mechanism, which locks the carrier portion 204 to the probe portion 260.

The locking ring 236 surrounds the carrier 232, and rotates both clockwise and counterclockwise in order to control movement of the ball bearings 408 and axially lock and unlock the carrier portion 204 to/from the probe portion 260. In one embodiment, the robotic arm 104 includes a feature to rotate the locking ring 236 under either operator or computer control. Operation of the locking ring 236, carrier 232, and ball bearings 408 is described in more detail with respect to FIGS. 4, 5, 6A, and 6B.

The nose ring 240 is rigidly coupled to the shroud 228 (and therefore also to the lock tab retainer 208 and end cap 244). The nose ring 240 provides a bearing surface to the probe portion 260, and mechanically isolates the rotating locking ring 236 from the probe portion 260.

The probe portion 260 may be simpler than the carrier portion 204, in order to allow for production of more probe portions 260 to be semi or permanently affixed to toolheads 108, 120. Probe portion 260 includes two components (not including fasteners): a probe 252 and a common mount 248. The probe 252 fits within the carrier 232, and receives the ball bearings 408 to axially couple the carrier portion 204 to the probe portion 260. In the preferred embodiment, the slope of the recesses 404 may be designed to pull the probe 252 into a tightly coupled arrangement within the carrier 232 as the ball bearings 316 are pressed into the recesses 404 by the locking ring 236. For separable robotic interfaces 112 that support an optional functional interface 124, the probe 252 must also support whatever cables, pipes, or other types of connections are required by interchangeable toolheads 120.

The probe 252 is rigidly coupled to the common mount 248, and rotates in concert with the common mount 248. The common mount 248 provides a standard interface with the toolhead 108 or interchangeable toolheads 120. In one embodiment, the probe 252 may be integrated with the common mount 248 in a common part. In the preferred embodiment, the common mount 248 may include two or more flats or other features that allow the probe portion 260 to be captured within a fixture 804. This may allow a probe portion 260 (with or without a toolhead 108) to be positioned within the fixture 804 by a human operator in preparation for toolhead 108 mounting to a robotic arm 104. Because the probe portion 260 is simpler and has fewer components than the carrier portion 204, the probe portion 260 may be less expensive to manufacture and obtain. Advantageously, this may allow more toolheads 108, 120 to be mounted to probe portions 260 to facilitate rapid tool changing. The bolt pattern for the common mount 248 in some embodiments may include a UR-3 (Universal Robotics) bolt pattern so that any tools designed for a universal robot series (UR-3 thru UR-5) may be directly mounted and used with the separable robotic interface 112.

In one embodiment, the separable robotic interface 112 may have a nominal diameter of 8.5 centimeters (cm) with a combined length of 9.0 cm (including common mount 248 and probe 252) to the proximal face of a capture assembly. The separable robotic interface 112 may be scaled down to a smaller size having an outside diameter of <2.50 cm and scaled up for heavy industrial uses to a diameter of >40.0 cm. In some embodiments, the diameter may vary more than the overall length. Very large diameter separable robotic interfaces 112 may be used for on-board refueling of ships or to manipulate large objects. In space embodiments, if the distal probe portion 260 is fixed to a panel, the separable robotic interface 112 may be used to construct space-based structures (both temporary and permanent).

In one embodiment, the separable robotic interface may be manufactured from 6061 aluminum with an ABS plastic (ABS) carrier 232, steel ball bearings 316, and stainless mounting screws. For large industrial variants, the body may be manufactured with cast iron or bronze for the carrier portion 204 and a suitable grade of bolts. For a very small variant, the entire unit may be manufactured using plastics.

Referring now to FIG. 3, a diagram illustrating a carrier portion of an interface to a robotic arm 300 in accordance with embodiments of the present invention is shown. FIG. 3 illustrates an assembled carrier portion 204 about to be mated with the free end of the robotic arm 116B. Visible is the radial locking tab 212, the locking ring 236, a coupling surface to a probe portion 304, ball bearings 316, and retaining holes for ball bearings 308. In some embodiments, the free end of the robotic arm 116B may include various components and features to support 312 the functional interface 124. For example, functional interface 124 may include any combination of electrical power or data cabling, fluid or gas transfer components, or mechanical actuators. Functional interface support 312 components may be required to operate the range of interchangeable toolheads 120 supported by the separable robotic interface 112.

Referring now to FIG. 4, a diagram illustrating ball bearing fit and position to the probe 400 in accordance with embodiments of the present invention is shown. The probe 252 fits within the carrier 232. In order to axially lock the carrier portion 204 to the probe portion 260, one or more ball bearings 316 are forced into matching recesses 404 on the outer surface of the probe 252.

In the preferred embodiment, the probe 252 may include a hollowed-out portion to accommodate a probe portion of the functional interface 124 (i.e. the probe functional interface 408). Functional interfaces 124 may include one or more of electrical power transfer, data transfer, fluid transfer, gas transfer, mechanical force transfer, or magnetic force transfer. In most cases, the functional interface 124 is utilized by actuators or sensors associated with one or more toolheads 108, 120. In order to support the functional interface 124, matching pathways need to be provided through the carrier portion 204, and in most embodiments the robotic arm 104 itself.

Referring now to FIG. 5, a diagram illustrating a probe and plug fit to a carrier 500 in accordance with embodiments of the present invention is shown. FIG. 5 illustrates the interface between a probe 252, a plug 224, and a carrier 232. When the carrier portion 204 is assembled, the plug 224 slides longitudinally within the carrier 232. In the preferred embodiment, the plug 224 does not rotate within the carrier 232 due to a plug alignment pin or feature 508 on an outer surface of the plug 224 engaging a matching plug alignment slot 512 in a rear outer portion of the carrier 232. The depth of the plug alignment slot 512 regulates a maximum distance the plug 224 may extend forward into the carrier 232. In the preferred embodiment, the depth of the plug alignment slot 512 corresponds to a plug 224 position in the carrier 232 whereby the plug 224 at least partially covers the ball bearings 316 and retaining holes for ball bearings 308. Although one plug alignment pin 508 and matching plug alignment slots 512 are shown in FIG. 5, it should be understood there may be any number of plug alignment pins 508 and plug alignment slots 512 around the periphery of the plug 224 and carrier 232, respectively.

After the carrier portion 204 is axially aligned with the probe portion 260, carrier portion 204 is rotated in order to radially align a probe alignment pin 516 of the probe 252 with a probe alignment slot 520 of the carrier 232. This ties the rotation of the carrier portion 204 to the probe portion 260. The depth of the probe alignment slot 520 regulates a maximum distance the probe 252 may extend forward into the carrier 232. In the preferred embodiment, the depth of the probe alignment slot 520 corresponds to a probe 252 position in the carrier 232 whereby the probe 252 exposes the ball bearings 316 and the ball bearings 316 engage the recesses for ball bearings 404 in the sides of the probe 252. Although one probe alignment pin 516 and matching probe alignment slots 520 are shown in FIG. 5, it should be understood there may be any number of probe alignment pins 516 and probe alignment slots 520 around the periphery of the probe 252 and carrier 232, respectively.

The probe 252 in some embodiments includes a probe portion of the functional interface 412, and the plug 224 includes a carrier portion of the functional interface 504. When the probe 252 mates with the carrier 232, the probe functional interface 412 engages the carrier functional interface 504, which activates the functional interface 124 allowing for an installed toolhead 108 to utilize supported functionality.

Referring now to FIG. 6A, a diagram illustrating a locking ring in a locked disposition 600 in accordance with embodiments of the present invention is shown. The carrier 232 includes a number of retaining holes for ball bearings 308, which allows ball bearings 316 to move radially (i.e. in and out) of the holes 308 as determined by position of the locking ring 236. The locking ring 236 includes a number of locking ring recesses 604 symmetrically distributed on inside surfaces of the locking ring 236. In the preferred embodiment, there are six ball bearings 316, six retaining holes for ball bearings 308, and six locking ring recesses 604. In the locked position, the locking ring 236 is turned such that the locking ring recesses 604 are not in alignment with the retaining holes for ball bearings 308. This forces the ball bearings 316 toward the center of the carrier 232, and into the recesses for ball bearings 404, when the probe has been fully seated within the carrier 232. In the preferred embodiment, it is not possible to insert the probe portion 260 into the carrier portion 204 when the locking ring 236 is in the locked position 600.

Referring now to FIG. 6B, a diagram illustrating a locking ring in an unlocked disposition 620 in accordance with embodiments of the present invention is shown. In the unlocked position, the locking ring 236 is turned such that the locking ring recesses 604 are in alignment with the retaining holes for ball bearings 308. This allows the ball bearings 316 to move toward the outside of the carrier portion 204, and into the locking ring recesses 604. In the preferred embodiment, it is possible to insert the probe portion 260 into the carrier portion 204 when the locking ring 236 is in the unlocked position 620.

Referring now to FIG. 7, a diagram illustrating a radial locking system 700 in accordance with embodiments of the present invention is shown. The radial locking system 700 includes the end cap 244, the lock tab retainer 208, the radial locking tab 212, the radial lock 216, a radial spring 704, the carrier 232, and a carrier radial locking surface 708. Radial locking prevents the carrier portion 204 (and the probe portion 260, if coupled to the carrier portion 204), from rotating independently of the free end of the robotic arm 116B.

The radial spring 704 is installed between an interior surface of the lock tab retainer 208 and a bearing surface of the radial locking tab 212. The radial spring 704 exerts outward force to the radial locking tab 212 to force the tab 212 to laterally project from the side of the carrier portion 204.

The radial lock 216 is rigidly coupled to the radial locking tab 212, and moves in concert with the radial locking tab 212. In one embodiment, the radial lock 216 is attached by fasteners or welded to the radial locking tab 212. In another embodiment, the radial lock 216 and the radial locking tab 212 may be formed from the same piece of material. The radial lock 216 includes teeth that engage matching teeth of a carrier radial locking surface 708 when the radial locking tab 212 is not pushed inward laterally by an outside force (see FIGS. 11-12). Therefore, when the carrier portion 204 is not engaged with a fixture 804 (i.e. the radial locking tab 212 is not pushed in by the fixture projection 808), the carrier portion 204 is radially locked.

The carrier radial locking surface 708 is rigidly attached to the inside surface of the carrier 232. In one embodiment, the carrier radial locking surface 708 is a separate piece of material that is bonded or otherwise permanently attached to the inside surface of the carrier 232. In another embodiment, the carrier radial locking surface 708 is the same material as the carrier 232, and is machined, milled or otherwise formed as part of the carrier 232 itself. Radial "unlocking" allows the rotation of the outside part of the carrier portion 260 while the carrier 232 (and the ball bearing holes 308) remains aligned with the probe 252. The rotation of the outside shell is what turns the locking ring 236, which drives the ball bearings 316.

Referring now to FIG. 8, a diagram illustrating a fixture interface to the separable robotic interface 800 in accordance with embodiments of the present invention is shown. FIG. 8 illustrates an exploded view of the principal components used in toolhead change operations. The probe portion 260, which includes the probe 252 and the common mount 248, directly interfaces with the fixture 804.

A static fixture 804 provides a docking point between the carrier portion 204 and the probe portion 260. The fixture 804 may include one or more features that aid in capture, locking, and tool-free toolhead 108, 120 replacement. In one embodiment, the fixture 804 may include a pair of fixture jaws 816 that allow the probe portion 260 to be moved into the jaws 816 or removed from the jaws 816. In the preferred embodiment, the fixture jaws 816 may include ramped lead-in to provide easier access. The common mount 248 may include one or more flats 820 (two are shown on opposite side of the common mount 248) that prevent axial and rotational movement of the common mount 248 when inserted into and captured by the fixture 804. The fixture 804 may also include a fixture projection 808 that extends toward a robotic arm 104. The fixture projection 808 makes contact with the radial locking tab 212 and radially unlocks the common mount 204 when engaged with the tab 212. In order to minimize interference with the common mount 204 and radial locking tab 212, a leading edge of the fixture projection 808 may also be ramped 812.

Referring now to FIG. 9, an illustration depicting a toolhead assembly to a fixture 900 in accordance with embodiments of the present invention is shown. A toolhead assembly 904 may include a toolhead 108, a common mount 248, and a probe 252 pre-assembled as a unified assembly. Therefore, any functional connections between the probe functional interface 412 and the toolhead 108 may already be present, and only require coupling to the carrier functional interface 504 and robotic arm 104 to make the functional interface 124 operational.

The toolhead assembly 904 is moved into the jaws 816 in order to prepare for a separable robotic interface 112 mating operation (FIG. 14). In one embodiment, the toolhead assembly 904 is manually moved into the fixture 804. In another embodiment, the toolhead assembly 904 is moved into the fixture 804 by a robotic arm 104 or other means. For example, a first robotic arm 104A may control a tool crib that populates or unpopulates one or more fixtures 804 with specific toolhead assemblies 904 based on expected needs related to another robotic arm 104B. The other robotic arm 104B then accesses (i.e. mounts and unmounts) toolhead assemblies 904 based on current need/mission.

In some embodiments, a toolhead assembly 904 may not be present, and only a probe portion 260 may be secured within a fixture 804. For example, if a toolhead 108 must be manually attached to the common mount 248, it may be more efficient to first mate the carrier portion 204 with the probe portion 260, then later attach a selected toolhead 108 to the common mount 248.

Referring now to FIG. 10, an illustration depicting axially aligning a carrier portion with a probe portion 1000 in accordance with embodiments of the present invention is shown. Once a toolhead assembly 904 or a probe portion 260 is secured within the fixture 804, a free end of a robotic arm 116B is maneuvered in order to approach the secured toolhead assembly 904 or probe portion 260.

The free end of the robotic arm 116B has been previously attached to a carrier portion 204. Once in proximity to the fixture 804, the free end of the robotic arm 116B may be moved vertically and/or horizontally in order to axially align the carrier portion 204 to the probe portion 260. Also, the radial locking tab 212 may be aligned with the fixture projection 808 in order for the radial locking tab 212 to be depressed by the fixture projection 808 and ramp 812 when they make contact with the radial locking tab 212.

Referring now to FIG. 11, a diagram illustrating a carrier portion engaging a probe portion 1100 in accordance with embodiments of the present invention is shown. FIG. 11 illustrates a docking/mating sequence between the carrier portion 204 and probe portion 260 out of the fixture 804, but is illustrated with the interface shown separately to provide for clarity of the mated interface detail. In actuality, the toolhead assembly 904 or probe portion 260 is fully captured within the fixture 804 during this step.

Once the carrier portion 260 is axially aligned with the probe portion 260, and the radial locking tab 212 is aligned with the fixture projection 808/ramp 812, the robotic arm 104 moves the carrier portion 204 so that it slides over the probe portion 260. The probe portion 260 auto-centers within the carrier portion 260, and a distal end of the probe 252 pushes against the plug 224 and plug spring 220.

While the carrier portion 204 is engaging the probe portion 260, the radial locking tab 212 engages the ramp 1104, which depresses the radial locking tab 212. This, in turn, disengages the radial lock 216 from the carrier radial locking surface 704, which disengages or deactivates the radial lock. By disengaging or deactivating the radial lock, the locking ring 236 is now free to rotate or turn.

Referring now to FIG. 12, a diagram illustrating axial and radial locking 1200 in accordance with embodiments of the present invention is shown. FIG. 12 illustrates both axially and radially locking the robotic arm 104/carrier portion 204 with the probe portion 260 or toolhead assembly 904.

With the probe 252 fully seated within the carrier portion 204 and the radial locking tab 212 depressed by the fixture projection 808/ramp 812, the separable robotic interface 112 is now ready to be completely locked. This is performed by either clockwise or counterclockwise rotating the locking ring 236. The locking ring rotates in order to axially and radially lock the separable robotic interface 1204. Axial locking is described in FIGS. 4-6B, where the locking ring 236 forces the ball bearings 316 into the probe recesses 404. Radial unlocking is described in FIGS. 7-9. Radial locking occurs in FIG. 12 by rotating the locking ring 236. The locking ring 236 is radially coupled to the lock tab retainer 208, which captures the radial locking tab 212. As the locking ring 236 rotates, the lock tab retainer 208 and radial locking tab 212 rotate together. This causes the radial locking tab 212 to not be depressed by the fixture projection 1208, and the radial spring 704 causes the radial locking tab 212 to project from the side of the carrier portion 212. This also causes the radial lock 216 to engage the carrier radial locking surface 708, which radially locks the carrier portion 204. In this way, rotating the locking ring 236 both axially and radially locks the probe portion (and any attached toolhead 108), the carrier portion 204, and the free end of the robotic arm 116B.

Referring now to FIG. 13, a diagram of removing a toolhead and separable interface from a fixture 1300 in accordance with embodiments of the present invention is shown. Following axially and radially locking the toolhead assembly 904 or probe portion 260 to the carrier portion 204/robotic arm 104, the robotic arm 104 slides the toolhead and separable interface out of the fixture 1304. At this point, the robotic arm 104 is free to move and use the separable robotic interface 112 and any attached toolhead 108.

Referring now to FIG. 14, a flowchart illustrating a separable interface mating process in accordance with embodiments of the present invention is shown. Flow begins at block 1404.

At block 1404, the probe portion 260 is captured within a fixture 804. Flow proceeds to block 1408.

At block 1408, a robotic arm 104 axially aligns a carrier portion 204 with the probe portion 260. Flow proceeds to block 1412.

At block 1412, the robotic arm 104 slides the carrier portion 204 over the probe portion 260. Flow proceeds to block 1416.

At block 1416, the fixture depresses a radial locking tab 212 to radially unlock the carrier portion 204. Flow proceeds to block 1420.

At block 1420, the probe portion 260 compresses a plug 224 in order to release ball bearings 316. Flow proceeds to block 1428 and optional block 1424.

At optional block 1424, a functional interface 124 is engaged. A probe portion functional interface 412 mates with a carrier portion functional interface 504. Flow proceeds to block 1428.

At block 1428, the robotic arm 104 rotates a locking ring 236 of the carrier portion 204. Flow proceeds to blocks 1432 and 1436.

At block 1432, the radial locking tab 212 releases from the fixture 804 and radially locks the probe portion 260 to the carrier portion 204. Flow proceeds to block 1440.

At block 1436, the locking ring 236 forces ball bearings 316 into probe portion recesses 404 to axially lock the probe portion 260 to the carrier portion 204. Flow proceeds to block 1440.

At block 1440, the robotic arm 104 laterally slides the separable interface 112 and any attached toolhead 108 out of the fixture 804. Flow ends at block 1440.

Referring now to FIG. 15, a flowchart illustrating a separable interface unmating process in accordance with embodiments of the present invention is shown. Flow begins at block 1504.

At block 1504, the robotic arm 104 moves a toolhead 108 coupled to a free end of the robotic arm 116B into proximity with a fixture 804. Flow proceeds to block 1508.

At block 1508, a distal joint of the robotic arm 104 rotates to cause a radial locking tab 212 to align with a fixture projection 808 and common mount flats 820 to align with fixture jaws 816. Flow proceeds to block 1512.

At block 1512, the robotic arm 104 laterally slides a separable robotic interface 112 into the fixture 804. The common mount flats 820 are captured between the fixture jaws 816. Flow proceeds to block 1516.

At block 1516, the fixture projection 808 depresses the radial locking tab 212 to disengage the radial lock. Flow proceeds to block 1520.

At block 1520, the distal joint of the robotic arm 104 rotates a locking ring 236 of the carrier portion 204 of the separable robotic interface 112. Flow proceeds to block 1524.

At block 1524, the locking ring 236 relieves force on ball bearings 316 into probe recesses 404. Flow proceeds to block 1528.

At block 1528, the robotic arm 104 moves the carrier portion 204 axially away from the probe portion 260 to unmate the separable robotic interface 112. Flow proceeds to block 1532.

At block 1532, in response to separating the probe portion 260 from the carrier portion 204, the probe portion 260 decompresses the plug 224 within the carrier portion 204. Flow proceeds to block 1540 and optional block 1536.

At optional block 1536, the functional interface 124, if present, is disengaged. Therefore, any power, data, fluid, gas, mechanical, or magnetic connections of the functional interface 124 are disconnected between the probe portion functional interface 412 and the carrier portion functional interface 504. Flow proceeds to block 1540.

At block 1540, ball bearings 316 of the carrier portion 204 disengage from the probe portion recesses 404 to axially unlock the probe portion 260 from the carrier portion 204. Flow proceeds to block 1544.

At block 1544, the robotic arm 104 separates the carrier portion 204 from the probe portion 260, and is able to mate to a different probe portion 260/toolhead assembly 904. Flow ends at block 1544.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A separable robotic interface, comprising:
   a carrier portion, configured to attach to a free end of a robotic arm, comprising:
   a spring-loaded plug, coaxial with and arranged to slide lengthwise within the carrier portion;
   one or more ball bearings, arranged within holes of the carrier portion;
   an axial lock feature; and
   a spring-loaded tab that extends laterally from the carrier portion, wherein the tab is configured to radially unlock the carrier portion when depressed and radially lock the carrier portion when not depressed; and a probe portion, configured to be attached to a toolhead, comprising:
  a probe, comprising one or more recesses on lateral exterior surfaces of the probe, configured to receive the one or more ball bearings in order to axially lock the carrier portion to the probe portion in response to the probe portion inserted a predetermined distance into the carrier portion and the axial lock feature is activated, further configured to radially align with the carrier portion in response to an alignment feature engages the carrier portion.

2. The separable robotic interface of claim 1, wherein the probe portion is configured to be rotated by the carrier portion in response to the tab is radially locked.

3. The separable robotic interface of claim 2, wherein the axial lock feature comprises a locking ring, wherein the axial lock feature is activated comprises one of:
  manually depress the tab and turn the locking ring to force the ball bearings into the recesses; or
  in response to the tab is depressed, the robotic arm rotates the locking ring to move the ball bearings into the recesses.

4. The separable robotic interface of claim 3, wherein the probe portion is captured within a fixture, wherein in response to the locking ring turned or rotated, the robotic arm is configured to remove the probe portion locked to the carrier portion from the fixture.

5. The separable robotic interface of claim 4, wherein the fixture comprises a projection that depresses the tab to radially unlock the carrier portion, in response to the probe portion is captured within the fixture and the tab is aligned with the projection.

6. The separable robotic interface of claim 2, wherein the probe portion further comprising:
  a common mount, coupled to the probe, configured to allow toolheads to be controlled by the robotic arm in response to the probe portion axially and radially locked to the carrier portion.

7. The separable robotic interface of claim 6, wherein the toolheads comprises one or more of tools, materials, sensors, components, or grappling devices.

8. The separable robotic interface of claim 6, further comprising a functional interface, wherein the probe portion comprises a probe functional interface and the carrier portion comprises a carrier functional interface, wherein in response to the probe portion inserted into the carrier portion the probe functional interface mates with the carrier functional interface.

9. The separable robotic interface of claim 8, wherein in response to the probe functional interface mates with the carrier functional interface, the toolhead is configured to be controlled through the mated functional interface.

10. The separable robotic interface of claim 9, wherein the mated functional interface comprises one or more of an electrical power interface, a data transfer interface, a fluid transfer interface, a gas transfer interface, or a mechanical force transfer interface.

* * * * *